ANALOG VOLTAGE MEMORY

Filed Dec. 22, 1960

Inventors
William E. Brandt
William P. Margopoulos
BY [signature]
Attorney

United States Patent Office 3,119,984

Patented Jan. 28, 1964

3,119,984

ANALOG VOLTAGE MEMORY

William E. Brandt, Cambridge, Mass., and William P. Margopoulos, Poughkeepsie, N.Y., assignors to International Business Machines Corporation, New York, N.Y., a corporation of New York Filed Dec. 22, 1960, Ser. No. 77,632

7 Claims. (Cl. 340—173)

This invention relates to analog potential memory apparatus and methods and more particularly to apparatus for taking, at any particular time, a sample of a potential varying with time and storing the sample potential for read-out at a later time, without substantial variation in the stored potential between the time of storage and the time of read-out.

In many control, computing and communication installations, it is desirable to be able to sample a potential which is varying with time at a particular instant and to hold the sampled value for a substantial period of time, in order that some further operation may be done in connection with the sampled value. For example, in analog-to-digital converters, an analog potential must be held for a substantial time while the digital conversion is taking place, digit-by-digit.

Analog potential memory devices of the prior art have commonly employed a single capacitor to store the sampled potential, and have attempted to minimize the leakage resistance across the storage capacitor so as to hold the potential as long as possible without substantial error. The best performance which has been obtainable in such prior art storage systems has been to store a potential for a time of the order of several milliseconds.

An object of the present invention is to provide an improved analog potential memory apparatus.

Another object is to provide an improved method for storing a sample of a potential varying with time.

A further object is to provide apparatus which is capable of storing a sampled value of an analog potential for a time of the order of several seconds without substantial error.

The foregoing and other objects of the invention are attained in the apparatus described herein. In that apparatus, the analog potential is sampled by connecting the source of potential through a sampling switch to a reactive impedance, which may be either a capacitor or an inductor. The energy stored in the reactive impedance by the sampled potential is utilized to supply a potential to one of two inputs of a summing amplifier having an output connected to the output terminal of the system. The output terminal of the summing amplifier is also connected to a second reactive impedance, which may be either a capacitor or an inductor. A switch is associated with this second impedance and is movable between one switching condition in which it maintains a particular electrical condition of the impedance at a zero value, and a second switching condition in which that electrical condition may vary. For example, if the second reactive impedance is a capacitor, the switch shunts the capacitor to hold the potential across the capacitor at zero, and the opening of the switch allows the potential on the capacitor to be varied by charging the capacitor. The switch just described is coordinated in its operation with the sampling switch controlling the charging of the first reactive impedance so that the electrical condition in the second reactive impedance is held at zero during the storage of energy in the first reactive impedance, and is allowed to vary after the termination of the energy storing operation.

An electrical potential developed by the second active impedance is connected to the input of a second amplifier having an output connected to a second input of the summing amplifier.

The potential across the first reactive impedance starts decreasing exponentially toward zero as soon as the sampling switch is opened, approaching zero asymptotically. The potential developed in the second impedance, on the other hand, starts at zero and increases as an inverse function of the first potential, approaching asymptotically the value of potential at the sampling switch at the time when it was opened. The characteristics of the two amplifiers may be so selected that the sum of the two input potentials to the summing amplifier at any instant, is substantially equal to the sample potential. The output of the summing amplifier is a measure of that potential. While the apparatus is theoretically capable of storing a sampled potential for an infinite time, it is in practice limited to a finite interval by the limitations of the physical elements in the circuit.

Other objects and advantages of the invention will become apparent from a consideration of the following specification and claims, taken together with the accompanying drawing.

FIG. 1

Figure 1:
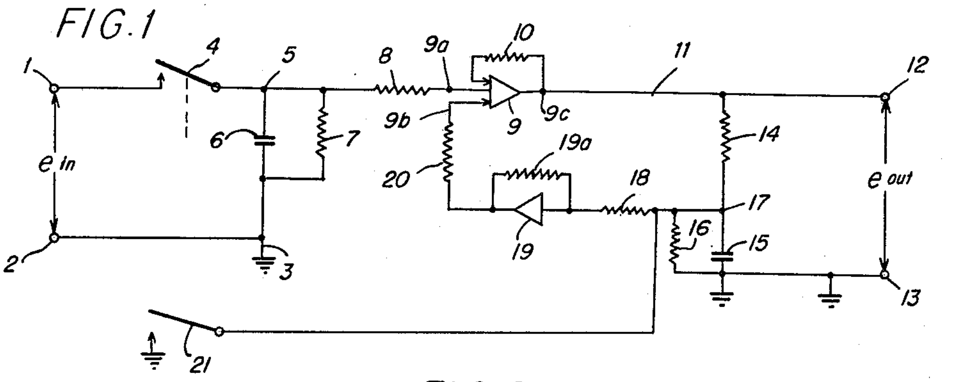
FIG. 1 is a wiring diagram of an electrical circuit embodying an analog potential memory apparatus in accordance with the invention.

Referring to FIG. 1, there are shown a pair of input terminals 1 and 2, connected across the source of an analog potential, varying with time, which is to be sampled at a particular time. The input terminal 2 is grounded, as shown at 3. The input terminal 1 is connected through a sampling switch 4 to a junction 5. A capacitor 6 and a parallel resistor 7 are connected between junction 5 and ground at 3.

While the sampling switch 4 is illustrated as a mechanical switch, it will be readily understood by those skilled in the art that the mechanical switch may be replaced by any equivalent switching device shiftable between a low impedance condition in which it passes electrical current and a high impedance condition in which it substantially blocks current flow. Many electrical switching devices employing vacuum tubes or transistors as switching elements are common in the art.

The resistor 7 may represent simply the leakage resistance internally of the capacitor 6, or it may be a physically separate resistor, as required by the characteristics of the circuit.

The junction 5 is connected through a resistor 8 to one input terminal 9*a* of a summing amplifier 9. The amplifier 9 may be of the type whose operation is described theoretically on pages 9 to 12 of the book entitled, "Analog Computer Techniques," by Clarence L. Johnson, published by McGraw-Hill in 1956. A detailed wiring diagram of such an amplifier is shown on page 186 of the same book. The amplifier 9 has input terminals 9*a* and 9*b* and an output terminal 9*c*. A feedback resistor 10 connects output terminal 9*c* to the amplifier input. The resistor 8 is connected to input terminal 9*a*.

Amplifier output terminal 9*c* is connected through a wire 11 to a system output terminal 12, which cooperates with a grounded signal output terminal 13.

A resistor 14 and a capacitor 15 are connected in series between the wire 11 and ground. A resistor 16 is in parallel with the capacitor 15. The common terminal 17 of resistor 14 and capacitor 15 is connected through a resistor 18 to the input terminal of an amplifier 19 having an output terminal connected through a resistor 20 to input terminal 9*b* of amplifier 9. A switch 21 is connected between the common junction 17 and ground. The switch 21, like the switch 24, may be an electronic switch rather than a mechanical switch, as shown. The switches 4 and 21 must be coordinated in their operation, to the extent that they are both opened simultaneously. Before the opening of the two switches, the switch 4 must remain closed long enough for potential at the input terminals 1 and 2 to charge the capacitor 6. Also, before the opening of switch 21, that switch must remain closed for a time long enough to discharge the capacitor 15.

OPERATION OF FIG. 1

When any capacitor is charged by connection to a source of a predetermined potential, and is thereafter disconnected from that source, the potential across the capacitor decreases exponentially with time, and approaches zero as a limit. A typical curve showing such a decrease with time appears at 22 in FIG. 2. The curve 22 may be considered as representing the potential across the capacitor 6 after the opening of the switch 4 at time $T_0$. This exponential decrease of potential with time is a well known characteristic of a capacitive impedance. The particular shape of the curve 22 depends upon the capacitance involved and the leakage resistance connected across its terminals.

This characteristic of a capacitor is commonly explained on the basis that energy is stored in an electrostatic field between the plates of a capacitor when the capacitor is charged by connection to a source of electrical energy. When the capacitor is disconnected, the stored energy in the field produces an electric current through the leakage resistance between the capacitor terminals, and that current is effective to dissipate the energy stored in the capacitor.

When a capacitor having zero charge is connected to a source of constant electrical potential through an impedance, the potential across the capacitor increases exponentially with time, approaching the potential of the source as a limit. Such a curve is shown at 23 in FIG. 2. For example, the capacitor may be the capacitor 15, the time $T_0$ may represent the opening of the switch 21, and the potential V may represent the potential at the wire 11. Again, the particular contour of the curve 23 depends upon the capacitance of the capacitor and upon the impedances connected in circuit with it, which determine the time constant for the circuit.

This characteristic of a capacitor is associated with the storage of energy in its electrostatic field, rather than with the dissipation of energy previously stored.

In the circuit of FIG. 1, if the impedances of the various elements are properly selected, the time constant of the circuit for charging capacitor 15 may be made equal to the time constant of the circuit for discharging the capacitor 6. The curves 22 and 23 are shown as having substantially equal time constants, so that they reach their limiting values at substantially the same time. The various circuit elements should be chosen so that the curves 22 and 23 not only reach their limiting values at the same time, but so that the sum of their values at any time $T_1$ is substantially equal to V. Note that the sum of the ordinate at point 24 and the ordinate at point 25 is substantially equal to V.

If the circuit constants in FIG. 1 are properly chosen, then at any time $T_1$ after the opening of the switches 4 and 21, the summing amplifier receives two input signals, one on the input line 9*a*, which may be the potential 24 and the other on the input line 9*b*, which may be the potential 25. These two potentials are summed by the amplifier 9, and its output signal at 9*c* is a measure of the sum of the two inputs. The output signal may, therefore, represent the potential V in FIG. 2. Note that at time $T_0$, when the curve 23 is at zero, the sum of the inputs is nevertheless equal to V, since the input 22 is equal to V. Furthermore, at the time $T_2$, when both the signals have reached their final limiting values, the input signal 23 is established at V, and the input signal 22 is at zero.

The following table shows, by way of example, a particular set of values of the various circuit elements which was constructed and successfully tested, and which held at its output a substantially constant voltage, with less than 1/10 of 1% error, for a time greater than 10 seconds after the opening of the switches 4 and 21.

*Table I*

| | |
|---|---|
| Capacitor 5 ________ mfd. | 0.01 |
| Resistor 7 ________ | 100K |
| Resistor 8 ________ | 1M |
| Resistor 10 ________ | 1M |
| Resistor 14 ________ | 1M |
| Capacitor 15 ________ mfd. | 1 |
| Resistor 16 ________ | 100K |
| Resistor 18 ________ | 1M |
| Resistor 19*a* ________ | 12M |
| Resistor 20 ________ | 1M |

If the gain of the amplifier 9 is unity, then the potential at output terminal 12 is equal to the potential at input terminal 1. If the gain of the amplifier 9 is greater than unity, then the potential at output terminal 12 is correspondingly greater than the input potential, but nevertheless varies directly with the input potential and may be taken as a measure of it. The gain of amplifier 9 must be at least equal to unity.

FIGS. 3 AND 4

Figure 2:
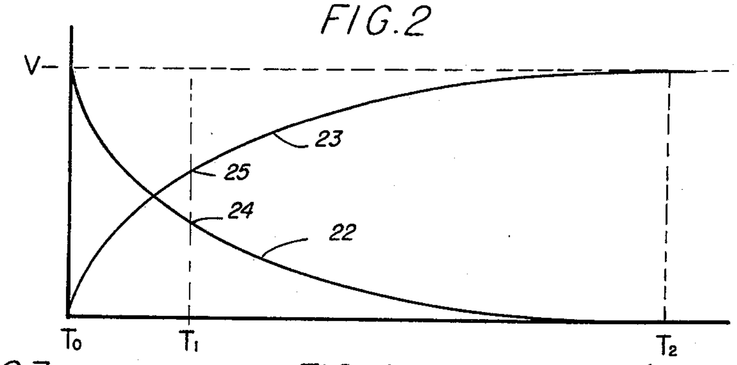
FIG. 2 is a graphical illustration of the variation of certain potentials in the circuit of FIG. 1.
Figure 3:
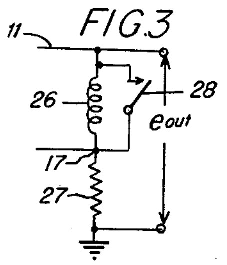
FIG. 3 is a fragmentary wiring diagram illustrating a modification of the output network of the circuit of FIG. 1.
Figure 4:
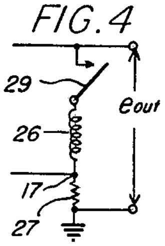
FIG. 4 is similar to FIG. 3, and illustrates another modification of the output network.

It is well known in the electrical art that when a circuit is first closed through an inductive element to a supply of constant potential, the current flow through the inductive element increases along a curve of the same general contour as the curve 23 of FIG. 2, approaching a limit determined by the potential of the source and the resistive impedance elements in the circuit. A circuit generally equivalent in its function to the circuit of FIG. 1 may, therefore, be provided by connecting an inductor 26 in place of the resistor 14 of FIG. 1 and connecting a resistor 27 in place of the capacitor 15. The switch 21 of FIG. 1 may be replaced either by switch 28 in parallel or with the inductor 26 or by switch 29 in series with the inductor 26, as shown in FIG. 4. In either case, the function of the switch 28 is to reduce the current in the inductor 26 to zero during the sampling interval, i.e., when switch 4 is closed. The selection of the parallel switch 28 or the series switch 29 depends upon the characteristics of the other elements in the circuit.

When the switch 28 is open, or the switch 29 is closed, as the case may be, the current in the inductor 26 is zero and the potential across the resistor 27 is consequently also zero. Upon reversal of the position of switch 28 or 29, the current through the inductor 26 and resistor 27 builds up and the potential across resistor 27 follows a similar characteristic.

FIG. 5

It is also well known that after a current has been established in an inductor connected to a source of potential, then if the circuit through the inductor is opened, the current in the inductor decays exponentially, following a curve generally similar to 22 in FIG. 2. The length of time required for the current to drop to zero is determined by the leakage resistance in parallel with the inductor.

In an inductor, this characteristic is associated with the dissipation of energy previously stored in an electromagnetic field, and corresponds to the similar characteristic encountered in connection with the electrostatic field of a capacitor, as described above.

Figure 5:
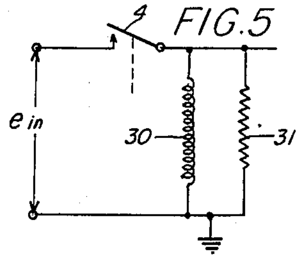
FIG. 5 is a fragmentary wiring diagram illustrating a modification of the input network in the circuit of FIG. 1.

There are shown in FIG. 5 an inductor 30 and a resistor 31 in parallel which may be substituted for the capacitor 6 and resistor 7 in parallel in the circuit of FIG. 1. The switch 4 is first closed for a time long enough to store energy in the electromagnetic field of the inductor in a quantity corresponding to the potential of the input source. When the switch 4 is opened, the magnetic field established around the inductor 30 gradually decays, supplying current through the resistor 31 and producing across the resistor 31 a potential which follows generally the curve 22 of FIG. 2.

FIG. 6

This figure illustrates the system of FIG. 1 schematically in the currently accepted analog computer technique for drawing schematic diagrams. An input signal is applied to an input terminal 32 and through a switch 33, corresponding to switch 4 of FIG. 1, to a network 34 having a transfer function equivalent to that of the networks 6, 7 of FIG. 1. The output of network 34 is fed to a summing circuit 35, whose output is fed through an amplifier 36 to an output terminal 37. A feedback circuit extends from output terminal 37 through a network 38 having a transfer function similar to that of the resistor 14, capacitor 15, and resistor 16 of FIG. 1. The output of network 38 is fed to an amplifier 39, whose output is in turn connected to a second input of the summing circuit 35. Either network 34 or 38 may be an RL circuit, an RC circuit, or a combination of RL and RC.

Figure 6:
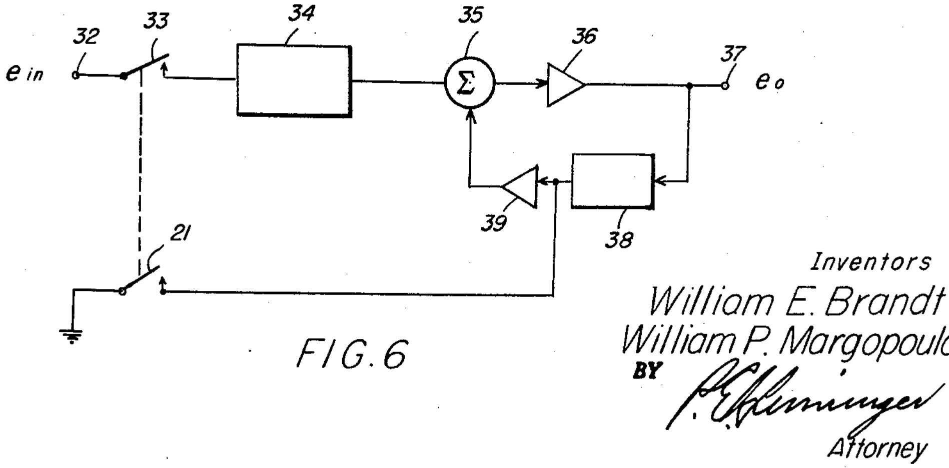
FIG. 6 is a schematic diagram illustrating another embodiment of the invention.

The diagram of FIG. 6 may be understood as a schematic representation of the circuit of FIG. 1, and all equivalent circuits.

While I have shown and described certain preferred embodiments of my invention, other modifications thereof will readily occur to those skilled in the art, and I, therefore, intend my invention to be limited only by the appended claims.

I claim:

1. Analog potential memory apparatus, comprising a source of potential varying with time, means for sampling said potential including first reactive impedance means, means connecting one terminal of the impedance means to a point of fixed potential, first switch means operable to connect said source to the other terminal of the impedance means for a time long enough to establish the potential of the source across the impedance means, a summing amplifier having first and second inputs and an output, means connecting said first input to said other terminal of the impedance, a second reactive impedance means, means connecting the second impedance means to the output of the summing amplifier, second switch means operatively connected to the second impedance means and shiftable between a first switching condition in which it is effective to establish an electrical condition of said second impedance means at zero and a second switching condition in said electrical condition may vary a second amplifier having an input and an output, means electrically connecting the second amplifier input to the second impedance means, and means connecting the second amplifier output to the second input of the summing amplifier, and switch operating means for opening said first switch means and concurrently shifting the second switch means to its second position, said first impedance means being thereafter effective to supply to the first input of the summing amplifier a first component potential varying as a first predetermined time function of the source potential sample at the time the first switch means is opened, said second impedance means and said second amplifier cooperating after operation of the second switch means to its second position to supply to the second input of the summing amplifier a second component potential varying with time as the difference between the potential sample and the first component potential, so that the potential at the summing amplifier output remains substantially constant and a measure of the potential sample.

2. Analog potential memory apparatus as defined in claim 1, in which said first impedance means comprises a capacitor, leakage resistance means connected in parallel with the capacitor, and said switch operating means is effective to close said first switch means for a time long as compared to the time constant of the first impedance means.

3. Analog potential memory apparatus as defined in claim 1, in which said second impedance means comprises a capacitor, said means connecting the second impedance means to the output of the summing amplifier comprises a resistor, said second switch means is connected in parallel with the capacitor and is effective in its first switching condition to shunt the capacitor and establish the potential across it at zero and is effective in its second switching condition to allow the capacitor to be charged by current flowing through the resistor.

4. Analog potential memory apparatus as defined in claim 1, in which said first impedance means comprises an inductor and a resistor in parallel between said point of fixed potential and the first switch means.

5. Analog potential memory apparatus as defined in claim 1, in which said second impedance means comprises an inductor and a resistor in series between the output of the summing amplifier and the point of fixed potential.

6. Analog potential memory apparatus as defined in claim 5, in which said second switch means is connected in parallel with the inductor and is closed in its first switching position to shunt the inductor and reduce the current therein to zero.

7. Analog potential memory apparatus as defined in claim 5, in which said second switch means is connected in series with the inductor and is open in its first switching position to reduce the current in the inductor to zero.

References Cited in the file of this patent

UNITED STATES PATENTS 2,832,887 Kirschner -------------- Apr. 29, 1958